2,695,320
Patented Nov. 23, 1954

2,695,320

VINYL FLUORIDE PREPARATION FROM 1,2-DIFLUOROETHANE

Ross M. Hedrick, Dayton, Ohio, assignor to Monsanto Chemical Company, St. Louis, Mo., a corporation of Delaware No Drawing. Application August 28, 1950, Serial No. 181,943

6 Claims. (Cl. 260—653)

The present invention relates to vinyl fluoride and deals more particularly with a new process for the production of vinyl fluoride.

Although vinyl fluoride is of great interest as a polymerizable or copolymerizable monomer for the preparation of valuable synthetic resins and plastics, its commercial usefulness has been limited by the difficulties entailed in its preparation. Its manufacture by reaction of acetylene with hydrogen fluoride gives rise to numerous difficulties, for the reaction of acetylene and hydrogen fluoride is very violent and uneven (see page 66 of "Organic Reactions," vol. II, edited by Roger Adams et al., N. Y., Wiley, 1944). Dehalogenation of fluorinated ethanes has likewise met with little success. Thus, it is difficult to obtain vinyl fluoride from 1,1-difluoro-2-chloroethane and the yields are not of significance (see Henne and Renoll, J. Amer. Chem. Soc., 58, 882–884 (1936)). Also, while 1,1-difluoroethane may be decomposed to yield some vinyl fluoride there is a tendency for the decomposition to yield primarily acetylene.

Now I have found that vinyl fluoride may be readily prepared by dehydrofluorination of 1,2-difluoroethane, which compound is readily obtainable by reaction of potassium fluoride with an alkali metal 1,2-ethylene disulfate (prepared by treating ethylene glycol with sulfuric acid and neutralizing the product with an alkali metal salt or hydroxide) according to the method described on page 41 of Final Report No. 1095 of the British Intelligence Objectives Subcommittee, London. The 1,2-difluoroethane thus obtained has a boiling point of approximately 29° C., and differs essentially from previously described crude, 1,2-difluoroethane which has been reported in the literature first as a gas and later as a material having a boiling point of from 10° C. to 11° C.

The dehydrofluorination of 1,2-difluoroethane to vinyl fluoride is surprising, for in the prior art (Henne and Renoll, loc. cit.) it is stated that 1,2-difluoroethane is a very unstable compound which decomposes spontaneously into butadiene at a temperature of 0° C. While spontaneous decomposition may lead to the diolefin, I have found that when the decomposition is activated either by heat and/or a catalyst of dehydrofluorination, only one molecule of hydrogen fluoride is removed from the 1,2-difluoroethane and vinyl fluoride is produced in good yields. The difference in the decomposition products of 1,2-difluoroethane, as demonstrated by the production of butadiene by spontaneous decomposition and the formation of vinyl fluoride in the activated decomposition of the present process is unexpected and does not conform to the behavior of other halogenated paraffins.

While the dehydrofluorination of 1,2-difluoroethane to yield vinyl fluoride may be activated by heat in order to obtain smooth reaction without substantial by-product formation, I have found that the use of a dehydrofluorinating agent or catalyst affords better control of the reaction than can be obtained by thermal dehydrofluorination, alone. As dehydrofluorinating catalysts I may use basic materials such as sodium, lithium or calcium oxide, sodium carbonate, potassium hydroxide and basic organic substances such as pyridine, quinoline, formamide, etc.; acidic substances such as silica, silica gel, alumina, alumina gel, aluminum chloride, zinc bromide, ferric chloride, phosphotungstic acid; silicotungstic acid and phosphomolybdic acid and neutral or substantially neutral materials such as charcoal, barium phosphate, calcium sulfate, corundum, glass fragments, etc.

Although the catalytic decomposition of 1,2-difluoroethane to vinyl fluoride may be effected in ordinary or increased temperatures and in the liquid or vapor phase, depending upon the nature of the dehydrofluorinating agent, the use of higher temperatures which tend to subdue or entirely eliminate side reaction, is preferred. Optimum conditions comprise activation of the dehydrofluorination by both heat and catalyst, and separation of the vinyl fluoride as soon as it is formed. When operating in the vapor phase I preferably pass the 1,2-difluoroethane through a tube of, e. g., quartz, Inconel metal, glass, etc., which is designed to allow rapid passage of the reactant and filled with the dehydrofluorinating catalyst or containing the dehydrofluorinating catalyst deposited on an inert support. The temperatures employed when using dehydrofluorinating catalysts or agents are generally lower than those employed in the absence of such agents and may range from below the boiling point of 1,2-difluoroethane to, say, 500° C., depending upon the nature of the dehydrofluorinating agent. Generally, I prefer to operate in the vapor phase, i. e., at temperatures of above the boiling point of 1,2-difluoroethane, and usually at temperatures of from, say, 100° C. to 500° C. A temperature range of from 200° C. to 400° C. is preferred. Operation in the vapor phase, with short contact time, permits rapid removal of the vinyl fluoride from the reaction zone, which rapidity cannot be attained when working in the liquid phase.

Separation of the vinyl fluoride may be effected by a variety of procedures. The effluent gas may be led directly into, or through, a chamber kept at Dry Ice temperature and thereby condensed. Or, if desired, the effluent gas may be cooled to just below the boiling point of 1,2-difluoroethane in order to separate any unreacted material, and the residual gas condensed by further cooling. For most purposes, however, I find that removal of the vinyl fluoride is satisfactorily attained by simply passing the effluent gas over sodium fluoride, soda-lime, water, or another hydrogen fluoride-absorbing agent, cooling it by passing it through water maintained at ordinary temperature and then conducting it to pressure vessels or tanks for storage. Inasmuch as vinyl fluoride readily undergoes polymerization, it is recommended that the entire length of the reaction tube be maintained at the reaction temperature as evenly as possible. Preferably the water through which the effluent gas is conducted should contain a small amount of a polymerization inhibitor.

The invention is further illustrated, but not limited, by the following examples:

Example 1

1,2-difluoroethane, B. P. 28 to 29.5° C., which was employed in this example, was prepared according to the method described on page 41 of Final Report No. 1095 of the British Intelligence Objectives Subcommittee, London.

5.5 g. (0.086 mole) of the vaporized 1,2-difluoroethane was rapidly passed through a quartz tube maintained at a temperature of 350° C. and containing calcium sulfate as the dehydrofluorinating agent, and the effluent gas was led through water and collected in a chilled receiver. Identification of the collected product as substantially pure vinyl fluoride was made by converting it to 1,2-dibromo-1-fluoroethane B. P. 124° C. $n_D^{25}$ 1.5075.

Example 2

10 g. of 1,2-difluoroethane was distilled during a period of 15 minutes, through a glass tube having an outer diameter of 28 mm. and packed with 6–8 mesh activated alumina. During the distillation, a 30 cm. length of the tube was kept at a temperature of 226° to 228° C. The outlet end of the hot tube was connected to a trap which was cooled in a Dry Ice-acetone mixture and the trap was connected to a device for collecting gas over water. An appreciable quantity of liquid condensed in the trap; only a very small quantity of gas went through to the collection device. Upon opening the trap to the air, the temperature of the boiling liquid was taken with a copper-constantan thermocouple and found to be minus 66° C. This boiling point indicates that the product is substantially pure vinyl fluoride. After taking the temperature of the boiling liquid the remainder of the product which had collected in the trap was passed into bromine, using a closed system. Upon treating the bromine solution with sodium hydroxide to destroy the excess bromine a water-insoluble layer separated out. This was washed, decanted and dried over phosphorus pentoxide. Removal of the phosphorus pentoxide by filtration gave substantially pure 1,2-dibromo-1-fluoroethane B. P. 118–120° C. $n_D^{25}$ 1.5021.

*Example 3*

In this example the apparatus used in Example 2 was employed except that the tube was packed with 6–8 mesh activated carbon instead of the activated alumina of Example 2. Although some gas went through to the collection device, most of the material coming from the outlet end of the tube condensed in the Dry Ice acetone trap and was identified as vinyl fluoride.

The dehydrofluorination reaction may likewise be carried out with other types of catalysts. Materials which catalyze the dehydrofluorination of 1,2-difluoroethane to vinyl fluoride and which may be used instead of the calcium sulfate, the alumina or the charcoal of the preceding examples are generally basic, acidic or neutral masses of large surface. The reaction may be effected in presence or absence of an inert diluent, e. g., nitrogen, or a gaseous activating agent such as air, oxygen or fluorine or hydrogen fluoride.

Vinyl fluoride is a valuable monomer for the preparation of fluorine-containing polymers and copolymers. Instead of collecting the vinyl fluoride as such, as it is evolved in the dehydrofluorination process, the gaseous product may be passed directly into a polymerizing vessel or it may be admixed with, or dissolved in the material with which it is to be copolymerized, and the resulting mixture or solution subjected to copolymerizing conditions. Separation of the vinyl fluoride may also be effected by constant absorption of the fluoride, as it is evolved, in an inert absorbing medium.

What I claim is:

1. The process of preparing vinyl fluoride which comprises heating 1,2-difluoroethane at a temperature of from 100° C. to 500° C.

2. The process of preparing vinyl fluoride which comprises passing vapors of 1,2-difluoroethane through a heated reaction zone at a temperature of from 100° C. to 500° C.

3. The process which comprises passing vapors of 1,2-difluoroethane through a reaction zone containing a dehydrofluorinating catalyst while maintaining in said reaction zone a temperature of from 200° C. to 400° C., and recovering vinyl fluoride from the effluents of the reaction zone.

4. The process which comprises passing vapors of 1,2-difluoroethane through a reaction zone containing calcium sulfate while maintaining in said reaction zone a temperature of from 200° C. to 400° C. and recovering vinyl fluoride from the effluents of the reaction zone.

5. The process which comprises passing vapors of 1,2-difluoroethane through a reaction zone containing alumina while maintaining in said reaction zone a temperature of from 200° C. to 400° C. and recovering vinyl fluoride from the effluents of the reaction zone.

6. The process which comprises passing vapors of 1,2-difluoroethane through a reaction zone containing charcoal while maintaining in said reaction zone a temperature of from 200° C. to 400° C. and recovering vinyl fluoride from the effluents of the reaction zone.

References Cited in the file of this patent

UNITED STATES PATENTS

| Number | Name | Date |
|---|---|---|
| 2,183,036 | Amos | Dec. 12, 1939 |
| 2,412,308 | Weiler | Dec. 10, 1946 |
| 2,442,993 | Cass | June 8, 1948 |

FOREIGN PATENTS

| Number | Country | Date |
|---|---|---|
| 261,689 | Germany | July 2, 1913 |